United States Patent
Elliott et al.

(10) Patent No.: US 9,212,312 B2
(45) Date of Patent: Dec. 15, 2015

(54) METHOD FOR REDUCING SILICONE ANTIFOAM USAGE IN DELAYED COKING PROCESSES

(71) Applicant: Foster Wheeler USA Corporation, Houston, TX (US)

(72) Inventors: John Daniel Elliott, Katy, TX (US); Jerry Neil Waggoner, Houston, TX (US)

(*) Notice: Subject to any disclaimer, the term of this patent is extended or adjusted under 35 U.S.C. 154(b) by 166 days.

(21) Appl. No.: 13/838,140

(22) Filed: Mar. 15, 2013

(65) Prior Publication Data

US 2013/0240408 A1    Sep. 19, 2013

Related U.S. Application Data

(60) Provisional application No. 61/612,852, filed on Mar. 19, 2012.

(51) Int. Cl.
| | | |
|---|---|---|
| C10G 9/14 | (2006.01) | |
| C10B 57/12 | (2006.01) | |
| B01D 19/04 | (2006.01) | |
| C10B 55/00 | (2006.01) | |
| C10B 51/00 | (2006.01) | |
| C10G 9/00 | (2006.01) | |
| C10G 9/02 | (2006.01) | |
| C10G 9/06 | (2006.01) | |

(52) U.S. Cl.
CPC ............. *C10B 57/12* (2013.01); *B01D 19/0409* (2013.01); *C10B 55/00* (2013.01)

(58) Field of Classification Search
CPC .............. C10G 9/00; C10G 9/02; C10G 9/06; C10G 9/14; C10B 51/00; C10B 57/12
USPC ................................................. 208/131–132
See application file for complete search history.

(56) References Cited

U.S. PATENT DOCUMENTS

| | | |
|---|---|---|
| 4,961,840 A | 10/1990 | Goyal |
| 4,969,988 A | 11/1990 | Jain et al. |
| 7,427,350 B2 | 9/2008 | Kremer |
| 2010/0116473 A1* | 5/2010 | Yang et al. ............... 165/134.1 |
| 2010/0300940 A1 | 12/2010 | Volk, Jr. |
| 2012/0103868 A1* | 5/2012 | Dindi et al. ..................... 208/89 |

* cited by examiner

*Primary Examiner* — Brian McCaig
(74) *Attorney, Agent, or Firm* — Winstead PC

(57) ABSTRACT

The current invention provides an improved petroleum coking process wherein the risk of silicone poisoning of units downstream of the coke drums is reduced. The method of the current invention controls the foam layer within the coke drum by injection of a silicone anti-foam agent in a highly aromatic carrier fluid such as slurry oil.

4 Claims, No Drawings

METHOD FOR REDUCING SILICONE ANTIFOAM USAGE IN DELAYED COKING PROCESSES

CROSS-REFERENCES TO RELATED APPLICATIONS

This Application claims the benefit under 35 U.S.C. §119(e) of U.S. Provisional Patent Application Ser. No. 61/612,852 filed Mar. 19, 2012, which is incorporated herein by reference in its entirety as if fully set forth herein.

BACKGROUND OF THE INVENTION

A modern petroleum refinery is designed to maximize the production of select liquid products from crude oil. In addition to the well known atmospheric and vacuum distillation processes used to provide refined products, many refineries utilize petroleum cokers to further process the residual materials remaining after distillation. The three common coking processes, fluid, flexi and delayed coking, have been used for decades. As such the common operating conditions for petroleum coking are well known throughout the industry.

During the fill cycle of the coking process, a foam layer forms on the surface of the feedstock as it fills the coke drum. Operators must control foaming within the coke drums otherwise the foam will enter the overhead vapor line resulting in a blockage.

Management of the silicone anti-foam (AF) agent injection is critical as any carry-over of the silicone material through the overhead vapor line will poison the catalyst found in downstream operating units such as the hydrotreating unit. Thus, operations which use too little silicone based AF agent may foam-over and carry the silicone downstream. However, excessive usage of silicone based AF agent, due to continuous injection, increases costs, may reduce the production of valuable liquids and may lead to an undesirable coke material.

Delayed coking reactions cause foaming in the coke drums which if uncontrolled can carry heavy tars and coke beyond the coke drum into piping and the distillation system. An uncontrolled foam-over will render the piping and fractionator in the coker inoperable and require a shutdown of the unit for cleaning and repair of any damaged mechanical elements. This is very costly and operators of delayed cokers avoid it by suppressing the foam front in the coke drum that forms during the thermal conversion of coker feedstock to coke and a range of vapors.

Foam suppression is typically accomplished by injection of high molecular weight silicone material in the form of polydimethylsiloxanes (PDMS) into the coke drum. The PDMS breaks down due to the high temperature in the coke drum and most of the cracked PDMS products vaporize and carry over and contaminate the hydrocarbon liquids recovered in the downstream fractionator. The contamination causes catalyst poisoning in refining units used to further process the coker liquids to finished products.

Coke drums are used to provide the residence time required for completion of the thermal reactions in a batchwise mode with a continous feed of hot feedstock. When the coke drum is filled, the hot feedstock is switched to another coke drum that has been prepared to receive it. To minimize the amount of PDMS used, it is typically injected only in the latter part of the coke drum fill cycle and during a few subsequent operations when foaming and reactant liquids are closest to the coke drum outlet. During these latter stages of the drum cycle, the drum may experience pressure surges. A sharp, small reduction in pressure can result in a significant increase in foam height risking a foamover. This is particularly true when there has been even a small reduction in the internal temperature of the coke drum.

Foaming is caused by higher surface tension and viscosity of the partially converted liquids in the coke drum and drum vapors blowing through the liquid. Common ways to reduce the risk of foam-overs and the usage of PDMS are:

1. Providing a higher vapor space in the coke drum when the coke drum fill cycle is complete. This can have negative operating cost implications or require unit modifications.
2. Increasing the temperature of the feed to the coke drum to reduce the surface tension and viscosity of the partially converted liquid reactant mass. The reaction heat is supplied by an upstream fired heater that may be limited in capability to operate at higher temperatures effectively and economically. In some cases there are undesirable process consequences to raising the coking temperature which can affect coke product properties.
3. Adding more aromatic oils to the feedstock. This requires that the added oil, commonly clarified slurry oil (CSO) from a fluid catalytic cracking unit, be provided in enough volume to beneficially affect the properties of the drum liquid. A commonly used material is called decant oil or clarified slurry oil (CSO). If too much is required an undesirable recycle of unconverted CSO can be formed between the delayed coker and the Fluid Catalytic Cracking Unit (FCCU).

PDMS is delivered to the refiner as a liquid diluted with hydrocarbon liquid usually with kerosene properties. Distribution of this antifoam liquid into the coke drum is typically accomplished by further dilution of the antifoam in a carrier oil, commonly a light and/or heavy gas oil fraction produced by the delayed coker.

Foam is produced by the actions described above and since the feed and vaporization occurs continuously through the coking cycle, the foam is continuously replenished as the foam bubbles drain. PDMS changes the liquid properties in the foam causing it to drain faster resulting in a reduced height of the froth.

Further improvements are desired in the current coking process. In particular, improved processes which control foaming in order to enhance liquid yield while improving the coke material are desired. Further, a coking foam control method which reduces the amount of silicone based AF agent used will particularly enhance the coking process.

DETAILED DESCRIPTION OF EXEMPLARY EMBODIMENTS

Feedstocks to all cokers vary from time to time. Therefore, one skilled in the art is accustomed to adjusting injection rates, times and quantities of AF agent to account for the variables of each feedstock. Since delayed coking is by far the most common coking method used today, the current invention will be described in the scope of a delayed coking process. However, those skilled in the art will recognize that the following silicone anti-foaming methods are equally applicable to fluid and flexi coking methods.

The claimed invention is directed to using highly aromatic hydrocarbon liquids as the carrier fluid used for injecting antifoam into the coke drum. In this manner, the aromaticity of the carrier fluid would modify the properties of the liquids in the foam bubbles which is relatively small compared to the entire mass of partially converted liquid. In this manner the effectiveness of the PDMS for foam drainage is increased and less PDMS may be used.

In an embodiment of the invention, the concentration of PDMS in the injecting fluid is lowered by virtue of using a highly aromatic carrier oil.

In a further embodiment of the invention, the amount of PDMS that is blended with the carrier oil is reduced by 30% or more relative to prior art compositions.

In an embodiment of the invention, the carrier oil that is used to blend the PDMS has an aromatic concentration by weight greater than 90%.

Carrier fluids that can be considered for the service include but may not be limited to: Light Cycle oil, heavy cycle oil or clarified slurry oil (CSO) from a FCCU; Liquids from an ethylene pyrolysis unit; or Gas Oils from the coking or re-cracking of previously cracked hydrocarbons such as the coking of CSO.

In an embodiment of the invention, PDMS is injected into the coke drum especially in the latter part of the coke drum cycle and a few subsequent steps through the drum depressuring to the coker blowdown system for steam, quench steam and hydrocarbon recovery. Another embodiment of the invention is directed to the use of carrier fluid for PDMS that is more aromatic than the liquids produced in the delayed coker. CSO is a preferred carrier because it contains a significant amount of mass that will not vaporize in most coke drums and therefore provides a longer period of time to affect foam drainage.

A typical coking operation uses two coking drums. Each drum cycles through eight standard steps:

1. Drum fill/coke conversion—Feedstock enters a pre-heated drum, which begins to fill with coke. (The time required to fill the drum to the desired level is referred to herein as the fill cycle, fill step or fill time.) Once a drum is full, feedstock is directed to an empty drum and the full drum is brought off-line.
2. Steamout—Steam stripping to help strip out any residual liquid hydrocarbon from the coke.
3. Water quench—Quenching with water of the full, off-line drum until the coke in the drum is cooled to between 200 and 275° F.
4. Draining—Quench water is removed from the off-line coke drum.
5. Unheading—Removal of the top and bottom drum heads from the off-line coke drum.
6. Decoking—High pressure water is used to cut the coke inside the drum. Coke and water pass through the bottom of the drum into the coke-handling system.
7. Heading and testing—Reinstallation of the drum heads and pressure testing of the drum with steam.
8. Warm up—Steam and hot hydrocarbon vapors from the on-line drum are directed through the off-line coke drum.

The drum fill/coke conversion step primarily determines the cycle time for the coke drum. The desired coke product and desired liquid production dictate the time required for the initial step. In most coking operations, cycle times vary between twelve and twenty-four hours with a twenty-four hour cycle being most common. Under these conditions and depending upon drum size, drum processing rates may vary between about 8000 barrels per day and 50000 barrels per day (bpd).

Depending on drum size, fill times may vary between about 8 to about 18 hours. Fill times are readily calculated by those skilled in the art based on the internal volume of coke drum and the feedstock flow rate into the drum. To maximize production, the drum is filled as completely as possible. Typically, nuclear level indicators (not shown) or other suitable devices are used to monitor the fluid level in the drum at various filling stages. Overfilling of the drum can lead to "foam-over" and fouling of overhead vapor line with coke.

AF agent is used to control foam levels and to manipulate the formation of coke. In general AF agent is injected through any conventional nozzle located near the top of the drum. AF agent is generally stored in a tank or other similar device and is pre-heated to a temperature between about 425° C. to about 460° C. (about 800° F. to about 860° F.), as known by those skilled in the art.

During filling of the coke drum and during the conversion of the feedstock to coke, the feedstock undergoes a thermal cracking process wherein additional liquid material and gas are produced. The coke drum product, in vapor and gaseous form, exits the drum through an overhead vapor line. Typically, drum outlet vapor temperature is between 410° C. and 455° C. (775° F. and 850° F.). The produced vapors are quenched in overhead vapor line and subsequently pass to a processing unit such as a coker fractionator.

In the above described process, injection of AF agent takes place at the conclusion of the fill step of the coking cycle. Most coke drums carry a nozzle or other port suitable for injecting AF agent. As known to those skilled in the art, injection of AF agent preferably occurs at a pressure sufficient to ensure that the AF agent reaches the foam layer prior to being vaporized and swept out of the drum. AF agent injection rate (pressure and volume/time) will vary depending on the feedstock and foam layer height in the drum. Under standard operating procedures, AF agent injection begins when the drum is about two-thirds full.

In one aspect, the current invention provides a method of using an AF agent comprising a carrier fluid to preclude foam-over in the coking process. In an embodiment of the invention, the AF agent is PDMS and the carrier fluid is CSO. Slurry oil is a product of the catalytic cracking unit commonly found in a petroleum refinery. While it is known to use slurry oil as a component of the feedstock to the coker, prior art methods have not used slurry oil as an AF agent. Preferably, the slurry oil is a clarified slurry oil that is substantially free of catalyst and other materials commonly found in the bottoms of the catalytic cracker.

Other embodiments of the current invention will be apparent to those skilled in the art from a consideration of this specification or practice of the invention disclosed herein. However, the foregoing specification is considered merely exemplary of the preferred embodiments of the current invention. The following claims define the scope of the current invention.

What is claimed is:

1. A method for precluding foam-over during a petroleum coking operation comprising: filling a coke drum with a coke feedstock; monitoring the coke feedstock level within said coke drum; stopping flow of coke feedstock when said feedstock occupies from about 66% to about 80% of the internal volume of said coke drum; injecting an anti-foam agent into said coke drum wherein the volume of the anti-foam agent is sufficient to preclude a foam layer on the surface of said feedstock from entering an overhead line carried by said coke drum and, wherein said step of injecting an anti-foam agent begins when said drum is filled between about 60% to about 70% of its total internal capacity; wherein said anti-foam agent comprises silicone and a carrier fluid, wherein said carrier fluid has an aromatic concentration by weight greater than 90%.

2. The method of claim 1, wherein said step of stopping flow of coke feedstock occurs when said feedstock fills from about 70% to about 80% of the internal volume of said coke drum.

3. The method of claim 1, wherein the carrier fluid is selected from the group consisting of Light Cycle oil, heavy cycle oil or clarified slurry oil (CSO) from a FCCU; liquids from an ethylene pyrolysis unit; and gas oils from the coking or re-cracking of previously cracked hydrocarbons.

4. The method of claim 1, further comprising the step of killing the foam when the coke drum has filled to about 75% of its internal capacity.

\* \* \* \* \*